US011284257B2

(12) United States Patent
Fong et al.

(10) Patent No.: US 11,284,257 B2
(45) Date of Patent: *Mar. 22, 2022

(54) VALIDATION ENGINE

(71) Applicant: PPIP LLC, Tempe, AZ (US)

(72) Inventors: Michael Fong, Tempe, AZ (US); Nerie Hsin-Wu Fong, Tempe, AZ (US); Teddy David Thomas, Bedford, NH (US)

(73) Assignee: PPIP, LLC, Chandler, AZ (US)

( * ) Notice: Subject to any disclaimer, the term of this patent is extended or adjusted under 35 U.S.C. 154(b) by 209 days.

This patent is subject to a terminal disclaimer.

(21) Appl. No.: 16/409,536

(22) Filed: May 10, 2019

(65) Prior Publication Data

US 2019/0349768 A1 Nov. 14, 2019

Related U.S. Application Data

(60) Provisional application No. 62/671,319, filed on May 14, 2018.

(51) Int. Cl.
*H04W 12/06* (2021.01)
*H04W 12/069* (2021.01)
*H04W 4/02* (2018.01)
*H04W 4/029* (2018.01)
*H04L 29/06* (2006.01)
*H04W 12/10* (2021.01)
*H04W 12/37* (2021.01)

(52) U.S. Cl.
CPC ....... *H04W 12/069* (2021.01); *H04L 63/0823* (2013.01); *H04L 63/0861* (2013.01); *H04W 4/025* (2013.01); *H04W 4/029* (2018.02); *H04W 12/10* (2013.01); *H04W 12/37* (2021.01)

(58) Field of Classification Search
None
See application file for complete search history.

(56) References Cited

U.S. PATENT DOCUMENTS

| 5,903,548 | A  | * | 5/1999 | Delamater | ............ | H04W 48/18 |
|---|---|---|---|---|---|---|
|   |   |   |   |   |   | 370/310 |
| 9,053,249 | B2 | * | 6/2015 | Perry | .................. | G06F 13/4081 |
| 10,037,508 | B1 | * | 7/2018 | Rusnak | ................. | H04W 4/023 |

(Continued)

OTHER PUBLICATIONS

Lincoln D. Stein, "Web Security. A step-by-Step Reference Guide", ISBN 0-201-63489-9, 1997. (Year: 1997).*

*Primary Examiner* — Piotr Poltorak
(74) *Attorney, Agent, or Firm* — Fernando & Partners, LLP

(57) ABSTRACT

In accordance with some embodiments, an apparatus for privacy protection is provided. The apparatus includes a housing arranged to hold a personal communication device. The apparatus further includes a local communication device at least partially supported by the housing, where the local communication device includes a personal communication device interface modem operable to provide a communication channel between the peripheral interface and the personal communication device. The apparatus further includes a validation engine coupled to the local communication device and operable to validate at least one of one or more portions of the personal communication device, a user of the personal communication device, or operational status of the personal communication device through the local communication device.

20 Claims, 8 Drawing Sheets

(56) References Cited

U.S. PATENT DOCUMENTS

| | | | | |
|---|---|---|---|---|
| 2004/0088548 | A1* | 5/2004 | Smetters | H04L 9/3265 |
| | | | | 713/175 |
| 2006/0143453 | A1* | 6/2006 | Imamoto | H04L 9/0891 |
| | | | | 713/169 |
| 2009/0161303 | A1* | 6/2009 | Hirota | G06F 1/1632 |
| | | | | 361/679.01 |
| 2011/0087890 | A1* | 4/2011 | Munsil | G06F 21/31 |
| | | | | 713/184 |
| 2013/0039491 | A1* | 2/2013 | Unagami | G06F 21/64 |
| | | | | 380/44 |
| 2014/0173692 | A1* | 6/2014 | Srinivasan | H04W 12/02 |
| | | | | 726/4 |
| 2014/0325240 | A1* | 10/2014 | Srinivasan | H04L 9/3213 |
| | | | | 713/192 |
| 2018/0302381 | A1* | 10/2018 | Naegle | H04L 63/18 |
| 2019/0384938 | A1* | 12/2019 | Gu | H04L 63/04 |

* cited by examiner

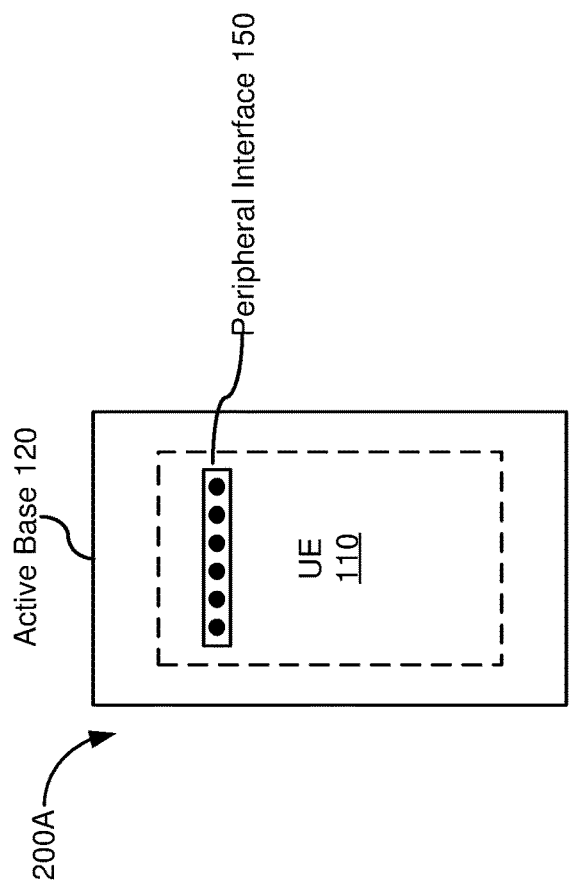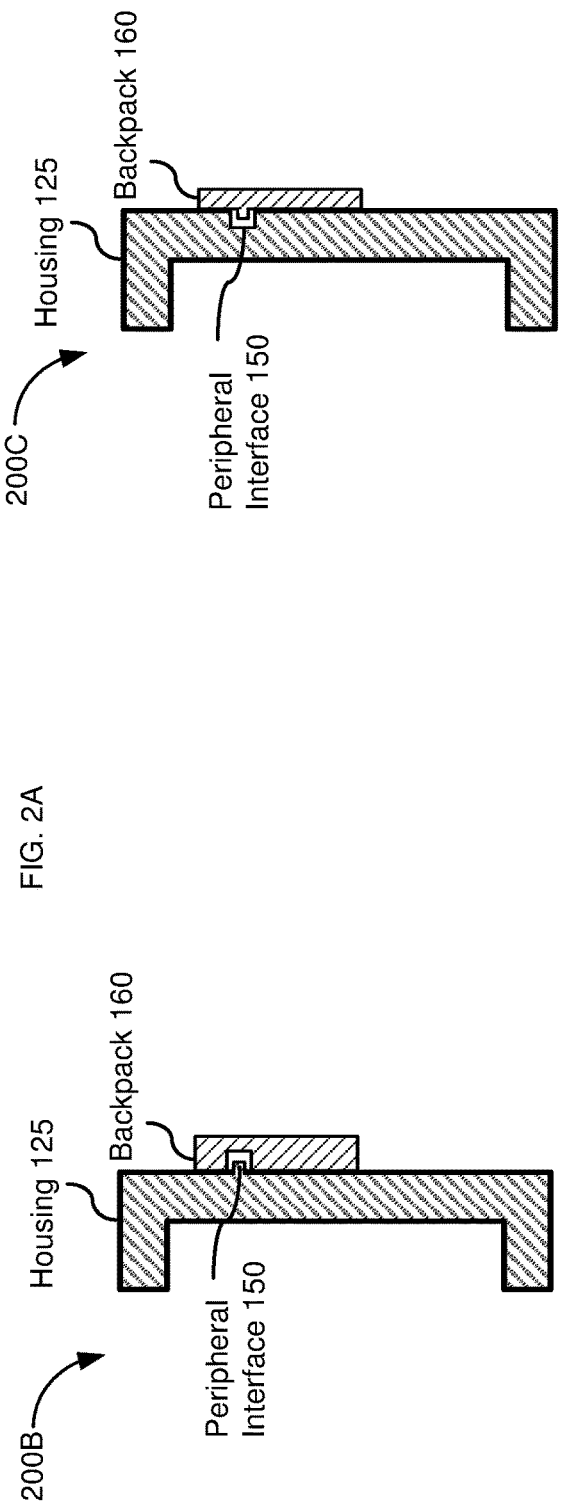

400A

400B

VALIDATION ENGINE

PRIORITY CLAIM

This application claims priority to U.S. provisional patent application No. 62/671,319 filed on May 14, 2018, the contents of which are hereby incorporated by reference.

TECHNICAL FIELD

This relates generally to the field of privacy protection, and more specifically to an apparatus for detecting compromised electronic devices.

BACKGROUND

Smartphones have sensors for collecting information of a user, including the surroundings of the user, e.g., microphones for recording voice, cameras for recording images, and an inertial measurement unit (IMU) for measuring location and position of the user. Smartphones also have radios for local or remote communications, such as a cellular radio for communicating with a base station, Global Positioning System (GPS) radio for communicating with a satellite, or a near field communication (NFC) radio, a WiFi radio, and/or a Bluetooth radio for pairing with another device nearby. The sensors and radios are capable of providing a wealth of user information to third parties, such that real-time and/or historical records of the user can be established. Currently, most smartphones do not alert users of the collection and dissemination of user private data. Consequently, when third-parties (e.g., hackers) gain unwanted access to a smartphone (e.g., hijack), a user may not be aware of the privacy invasion.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

FIGS. 2A-2C are illustrations of exemplary peripheral interfaces connectable to a housing of the apparatus in accordance with some embodiments;

Figure 1:
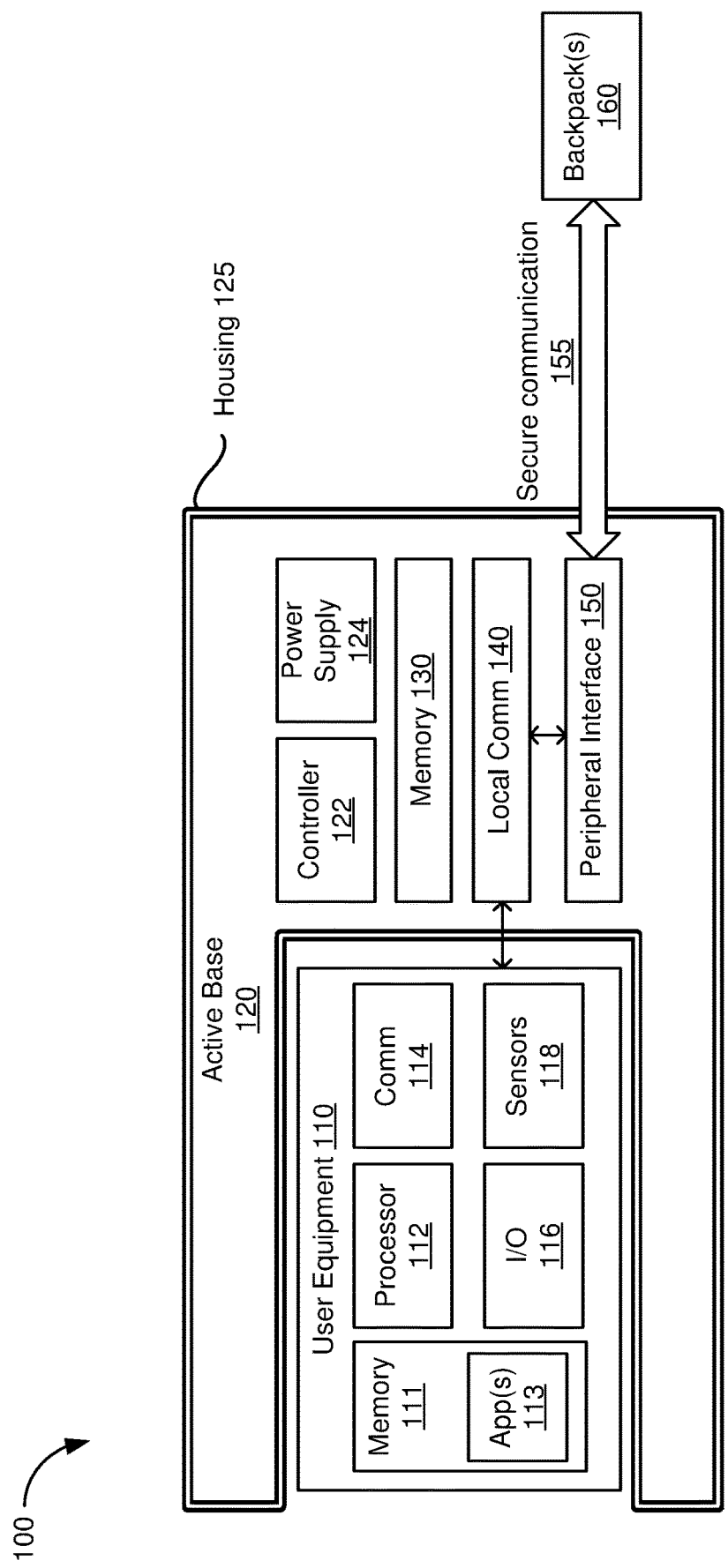
FIG. 1 is a block diagram of an exemplary apparatus holding a personal communication device in accordance with some embodiments.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

Accordingly, described herein is an apparatus (e.g., a smart case or an active base) for detecting potential compromise of a personal communication device (e.g., a smartphone, a wearable device, or a tablet, etc.). The apparatus has local communication devices that collect wireless communication information of the personal communication device, and in some embodiments validate the collected information in order to determine whether the personal communication device has been compromised. The apparatus also has an interface connectable to supplemental functional devices (e.g., a backpack attached to the apparatus). The supplemental functional devices are operable to pair with the personal communication device and provide supplemental functionalities to the personal communication device. For example, the supplemental functional devices can detect RF energy emission, sniff uplink TCP/IP transfer, or detect the presence of chemicals or drugs, etc. The additional information collected by the supplemental functional devices can be used by the personal communication device and/or the apparatus for further compromise detection and determination. The apparatus in accordance with embodiments described herein thus is particularly useful for intrusion detection and privacy protection.

In accordance with some embodiments, an apparatus includes a housing arranged to hold a personal communication device; a local communication device at least partially supported by the housing, wherein the local communication device includes a personal communication device interface modem operable to provide a communication channel between the peripheral interface and the personal communication device; and a validation engine coupled to the local communication device and operable to validate at least one of one or more portions of the personal communication device, a user of the personal communication device, or operational status of the personal communication device through the local communication device.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

It should be appreciated that in the development of any actual implementation (as in any development project), numerous decisions must be made to achieve the developers' specific goals (e.g., compliance with system and business related constraints), and that these goals will vary from one implementation to another. It will also be appreciated that such development efforts might be complex and time consuming, but would nevertheless be a routine undertaking for those of ordinary skill in the art of image capture having the benefit of this disclosure.

Referring to FIG. 1, a simplified block diagram 100 of an apparatus 120 (or an active base 120) holding a personal communication device 110 (or a user equipment) is depicted, in accordance with some embodiments. Different from a conventional base or case that merely holds a personal communication device, the active base 120 actively monitors and analyzes the personal communication device 110 in order to determine whether the personal communication device 110 is a compromised device. The compromise detection is described in detail below with reference to FIGS. 3 and 4A-4B.

In some embodiments, the active base 120 includes a housing 125 arranged to hold the personal communication device 110 (e.g., smartphone, wearable, tablet, etc.). In some embodiments, the housing 125 includes a plurality of components mateable with one another. In other words, the plurality of components, once mated with one another, form an assembly to hold and/or providing structural support of the personal communication device 110. The housing 125 allows a user to insert the personal communication device 110 into the active base 120 for more protection of work related sensitive information (e.g., in a work mode) or take the personal communication device 110 out of the active base 120 for less monitoring of the personal communication by an enterprise (e.g., in a personal mode).

Figure 3:
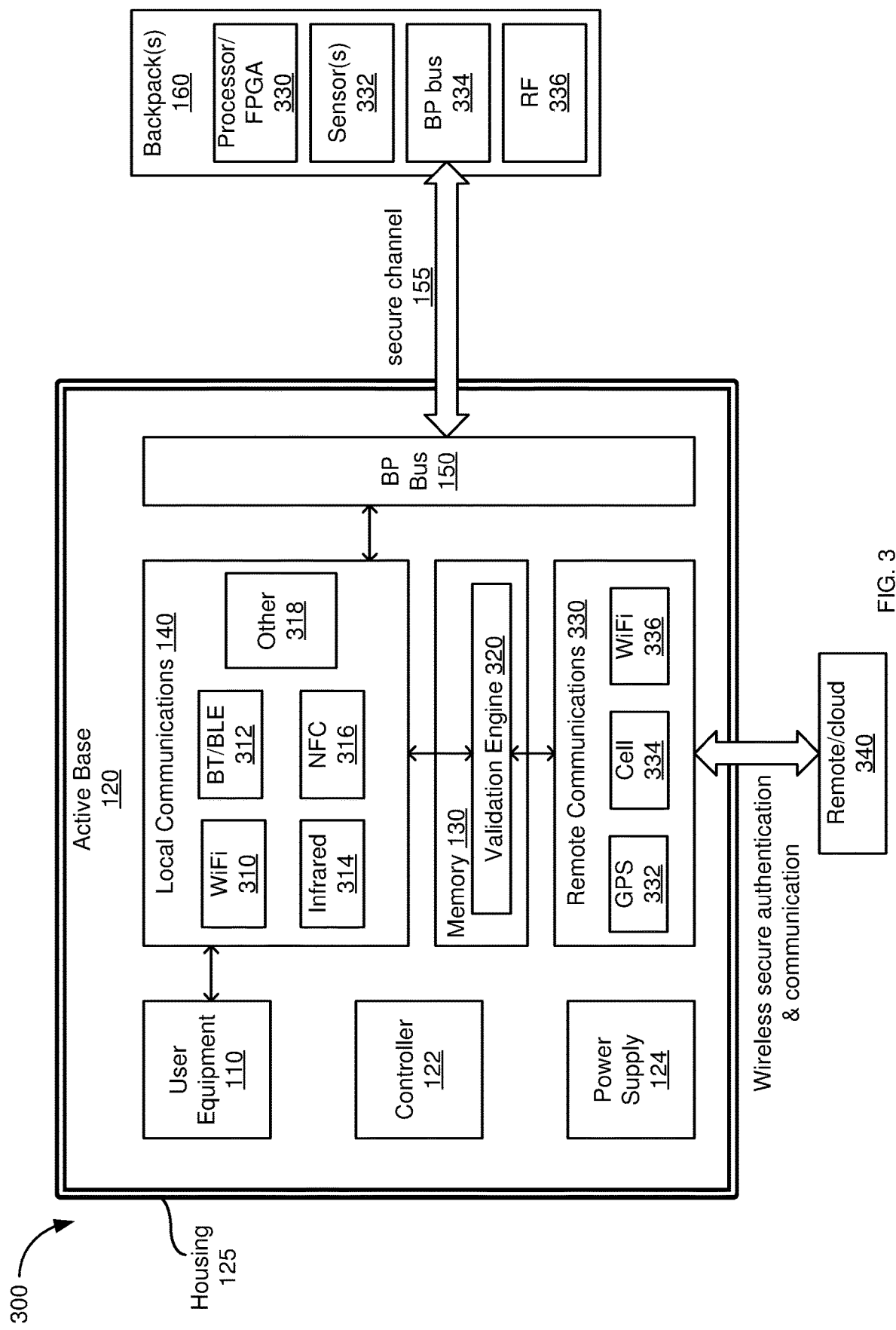
FIG. 3 is an illustration of an exemplary system comprising the apparatus enclosing the personal communication device in communication with backpack(s) and/or a cloud in accordance with some embodiments.

The active base 120 can have one or more moveable components (e.g., a hood or a mechanical switch) operable to slide to one or more positions (e.g., up or down) as well as non-moveable components. In such embodiments, the one or more moveable components, when in a first position (e.g., hood pushed down), are mateable (e.g., mechanically and/or electrically) with the non-moving components to form a housing assembly. The housing assembly forms an enclosure that at least partially support and hold the personal communication device 110, e.g., a partial enclosure as shown in FIG. 1 or a whole enclosure encapsulating the personal communication device 110 as shown in FIG. 3. When in the first position, the housing 125, along with other components of the active base 120, protects the personal communication device 110 against tracking or spying, e.g., by audio jamming, camera covering, and/or RF shielding, etc. When the one or more moveable components of the housing assembly are in a second position (e.g., a hood slid up), a user can take the personal communication device 110 out of the housing 125 and place the personal communication device 110 in a non-protected mode. In some embodiments, the position of the mechanical part, e.g., the position of a mechanical switch or the position of the hood, can be used by a validation engine (e.g., a presence validation engine) to determine the presence of the personal communication device 110, e.g., whether the personal communication device 110 resides in the active base 120. In some embodiments, as will be explained in further detail below, the active base 120 includes a validation engine that validates the status of the protection mechanisms. For example, when the personal communication device 110 is in the protected mode, the validation engine checks the status of the audio jamming, the camera covering, and/or the RF shielding, e.g., a rule-based check or a periodic check.

In some embodiments, the active base 120 includes a peripheral interface 150 (e.g., a backpack interface) to connect to a supplemental functional device 160 (e.g., a backpack). A supplemental functional device, as described herein, is a device connectable to the personal communication device 110 through the active base 120 and provides supplemental functions to the personal communication device 110. The peripheral interface 150 connects the supplemental functional device 160 to the active base 120 and a local communication device 140 further connects the peripheral interface 150 to the personal communication device 110. As such, the peripheral interface 150 is a modular interface for the backpack 160, which is a detachable device that allows supplemental hardware and software functionalities to be provided to the user of the active base

120. The supplemental functional device 160 is further described below with reference to FIG. 3.

In some embodiments, the housing 125 at least partially supports the peripheral interface 150. For example, in an exemplary system 200A shown in FIG. 2A, the peripheral interface 150 includes a number of connectors (e.g., contact pins or contact pads as indicated by the dots) connectable to the supplemental functional device 160. In some embodiments, the connectors are affixed to the housing 125 and at least partially supported by the housing 125, as shown in another exemplary system 200B in FIG. 2B. The connectors are mateable to the interface of the supplemental functional device 160. In some embodiments, as shown in yet another exemplary system 200C in FIG. 2C, the peripheral interface 150 is wholly supported by the housing 125, such that the peripheral interface 150 is integrated with or embedded in the housing 125 surface. In such embodiments, connectors from the supplemental functional device 160 can be plugged into the peripheral interface 150 in order to connect the supplemental functional device 160 to the active base 120. In the embodiments shown in FIGS. 2B and 2C, the peripheral interface 150 is operable to communicate with the supplemental functional device 160 via a physical wired channel including communication connectors. The physical channel forms a secure channel 155 for communication between the active base 120 and the supplemental functional device 160 as shown in FIG. 1.

It should be noted that though FIGS. 2A-2C illustrate the peripheral interface 150 with physical connectors that can provide wired connection, in some embodiments, the peripheral interface 150 is a wireless interface. In some embodiments, the peripheral interface 150 includes a wireless modem operable to wirelessly communicate with the supplemental functional device 160. In some embodiments, the peripheral interface 150 leverages the wireless communication capability of the local communication device 140 to communicate with the supplemental functional device 160. For example, the active base 120 can connect to a wireless communication-enabled backpack device 160 through a wireless peripheral interface 150 or through a wireless modem of the local communication device 140. As such, a wireless communication-enabled supplemental functional device 160 can communicate with the active base 120 without being in contact with the housing 125 or physically connected to the peripheral interface 150.

In some embodiments, the active base 120 includes a local communication device 140 coupled to the peripheral interface 150 and supported by the housing 125. In some embodiments, the local communication device 140 includes a personal communication device interface modem (e.g., a WiFi modem 310, a BT/BLE radio 312, an infrared radio 314, an NFC radio 316, or a Lightning® (a registered trademark of Apple Inc., Cupertino, Calif.) connector, etc.) operable to provide a communication channel (e.g., wirelessly or via physical connection) between the peripheral interface 150 and the personal communication device 110. In one direction, the communication channel carries information from the personal communication device 110 to the active base 120 for validation. In the other direction, the communication channel carries information from the supplemental functional device 160 via the peripheral interface 150 to the personal communication device 110 in order to supplement the functionality of the personal communication device 110.

In some embodiments, the active base 120 includes a controller 122 coupled to the peripheral interface 150 and the local communication device 140. Embodiments of the controller 122 include hardware, software, firmware, or a combination thereof. In some embodiments, the controller 122 is operable to manage the communication channel between the personal communication device 110 and the supplemental functional device 160 and through the local communication device 140 and the peripheral interface 150. In other words, the controller 122 manages a segment of the communication channel between the personal communication device 110 and the active base 120 through the management of the local communication device 140, and the controller 122 manages a segment of the communication channel between the active base 120 and the supplemental functional device 160 through the management of the peripheral interface 150. The communication between the supplemental functional device 160 and the personal communication device 110 under the management of the controller 122 is further described with reference to FIG. 3 below.

In addition to managing the communication channel, the controller 122 logs data in a secure area of the active base 120. Logging data in the secure area of the active base 120 has the advantage of providing trustworthy status reports of the personal communication device 110 for analysis in case the personal communication device 110 has been or potentially has been compromised. For example, many high-value enterprises invest significantly to implement tight monitoring and access control within their own networks, but lose visibility and control to external networks such as the cellular networks or WiFi hotspots. Once a smartphone is compromised, the status report from the phone operating system may not be trustworthy. By logging data in a secure area of the apparatus, reliable status reports can be generated for Enterprise Mobility Management (EMM), and EMM can then rely on the reliable information to limit the threat spread.

In some embodiments, the active base 120 includes a power supply 124. The power supply 124 supplies power to the peripheral interface 150, the local communication device 140, and/or the controller 122. In some embodiments, the power supply 124 includes at least one of a battery, a charging socket, a USB connector, a power plug, and/or a power socket. In some embodiments, the power supply 124 includes a connector for a battery. Though not shown in FIG. 1, in some embodiments, the power supply 124 includes a plurality of power supplying components, e.g., one battery providing power to the peripheral interface 150, a power plug providing power to the local communication device 140 and/or the controller 122, etc. The plurality of power supply components can be connected to be charged together, charged separately, aggregating power to supply to one or more hardware electronic components of the active base 120, or separately providing power to one or more hardware electronic components of the active base 120.

In some embodiments, the personal communication device 110 held by the active base 120 includes a processor 112, one or more communication devices 114, an input/output interface 116, sensors 118, memory 111, and applications 113, which further includes instructions stored in the memory 111 and executed by the processor 112. In some embodiments, the personal communication device 110 is a portable communications device, such as a mobile phone, a wearable device, a tablet, a laptop computer, a digital media player, an electronic reader, or the like. In some embodiments, the personal communication device is a non-portable device, such as a desktop computer, a data storage device, a smart TV, a video game console, a smart home appliance or the like that is capable of storing, transmitting, and receiving data. It will be appreciated that the components, devices or elements illustrated in and described with respect to FIG. 1 below may not be mandatory and thus some may be omitted in certain embodiments. Additionally, some embodiments can include further or different components, devices or elements beyond those illustrated in and described with respect to FIG. 1.

In some embodiments, the processor 112 is coupled to the one or more communication devices 114 in order to control the communication using the one or more communication devices 114, in accordance with some embodiments. In addition to controlling communication, the processor 112 processes data and executes applications 113, in accordance with some embodiments. In some embodiments, the processor 112 includes one or more chips and/or chipsets embodied in a variety of forms. For example, the processor 112 can be embodied as various hardware-based processing means such as a microprocessor, a coprocessor, a controller, or other computing devices including integrated circuits, such as an ASIC (application specific integrated circuit), an FPGA (field programmable gate array), some combination thereof, or the like. Although illustrated as a single processor, it will be appreciated that the processor 112 can comprise a plurality of processors. The plurality of processors communicate with each other and collectively perform one or more functionalities. In some embodiments, the processor 112 can be configured to execute instructions that can be stored in the memory 111 or that can be otherwise accessible to the processor 112. As such, whether configured by hardware or by a combination of hardware, firmware, and software, the processor 112 is capable of performing operations according to various embodiments.

In some embodiments, the memory 111 includes one or more memory devices, including fixed and/or removable memory devices. In some embodiments, the memory 111 provides a non-transitory computer-readable storage medium for storing computer program instructions (e.g., the application(s) 113) to be executed by the processor 112. In some embodiments, the memory 111 exchanges information with one or more of the processor 112, the input/output interface 116, the communication devices 114, or the sensors 118 via a bus. In some embodiments, the applications 113 stored in the memory 111 include an application for exchanging information between the personal communication device 110 and an external electronic device (e.g., the active base 120). The information exchange includes, for example, transmitting information obtained by the communication device 114 and/or the sensors 118 to an external electronic device (e.g., the active base 120) or receiving information from the external electronic device, e.g., the information gathered by the supplemental functional device 160 and relayed by the active base 120 via the peripheral interface 150 and the local communication devices 140.

In some embodiments, the input/output interface 116 provides a channel for input/output data between the processor 112 and input/output peripheral devices, such as a display, a keyboard, a mouse, a pen, microphones, cameras, and/or speakers of the personal communication device 110. In some embodiments, the peripheral devices are connected to the input/output interface 116 wirelessly, e.g., via the one or more communication devices 114.

In some embodiments, the one or more communication devices 114 connect the personal communication device 110 and an external electronic device wirelessly or through a wired connection. In some embodiments, the external electronic device is the active base 120, such that the one or more communication devices 114 connect to the active base 120 wirelessly or through a wired communication. The wireless communication includes at least one of, for example, WiFi (e.g., IEEE 802.11a, IEEE 802.11b, IEEE 802.11g, IEEE 802.11n, and/or IEEE 802.11ac), Bluetooth (BT), Bluetooth Low Energy (BLE), Near Field Communication (NFC), Global Positioning System (GPS), and/or cellular communication, including but not limited to long term evolution (LTE), wideband code division multiple access (W-CDMA), code division multiple access (CDMA), time division multiple access (TDMA), or Global System for Mobile Communications (GSM). The wired connections include at least one of, for example, a Universal Serial Bus (USB) connector, a High Definition Multimedia Interface (HDMI) connector, and/or a Lightning® (a registered trademark of Apple Inc. of Cupertino, Calif.) connector.

In some embodiments, the personal communication device 110 includes sensors 118, such as one or more accelerometers, gyroscopes, and/or magnetometers (e.g., as part of an inertial measurement unit (IMU)) for obtaining information concerning the position (e.g., altitude) of the personal communication device 110, light sensors, or acoustic sensors. In some embodiments, the sensors 118 are coupled to the input/output interface 116, such that the information collected by the sensors 118 are passed to the processor 112 by the input/output interface 116 for further processing. For example, the input device camera uses light sensors for light sensing. In some embodiments, the sensors 118 are coupled to the one or more communication devices 114, such that the information collected by the sensors 118 is transmitted to another device (e.g., the active base 120) for validation. In some embodiments, the sensors 118 are coupled to the power supply (e.g., a battery) of the personal communication devices 110 for obtaining the power level of the personal communication devices 110.

In some embodiments, the active base 120 monitors the protection status of the communication devices 114, I/O devices 116, and/or the sensors 118 on the personal communication device 110. For example, a validation engine on the active base 120 can check the status of the microphones, camera, and/or RF isolation device when the personal communication device 110 is supposed to be in a protected mode. In some embodiments, the validation engine (e.g., with an equipment validation engine) checks the amount of light detected by the light sensors in order to determine whether the camera is properly covered. In some embodiments, the validation engine checks the amount of RF emission in order to determine the effectiveness of the RF isolation.

In some embodiments, the active base 120 includes speakers for feeding audio masking sound to the microphones on the personal communication device 110 through an audio seal. In order to verify the proper functioning of the audio jamming, the active base 120 verifies the amplitude of the audio signal detected by a microphone of the active base 120. When the personal communication device 110 is being protected by the active base 120 and the audio seal is intact, the microphone on the active base 120 will receive a reduced audio masking signal outputted by the speakers of the active base 120. On the other hand, in case the personal communication device 110 is not properly held by the active base 120 and/or the audio seal is broken, and audio masking signal will tunnel out directly at the personal communication device 110. As a result, the microphone on the active base 120 will receive a louder audio masking signal. Thus, by verifying the amplitude of the audio masking signal, the validation engine can determine the status of the audio sealing.

In another example, the active base 120 can include a magnetometer and a magnet that are least partially supported by the housing 120. In some embodiments, the magnet is placed at the moving parts of the active base 120, e.g., the hood and/or the mechanical switch. By placing a magnet at the moving part(s) of the active base 120, the displacement of the moving part(s) can be measured as a function of the change in magnetic field detected by the magnetometer. As such, the validation engine can validate whether the personal communication device 110 is in a protected mode or unprotected mode based on the change in the magnetic field detected by the magnetometer. Further, load or unloading the personal communication device 110 from the active base 120 involves moving such mechanical part(s), e.g., by sliding up/down to close/open the enclosure. By adding the magnet at active base 120, the presence of the personal communication device 110 held by the active base 120 can be detected by the loading/unloading action corresponding to the magnetometer reading.

In yet another example, the active base 120 can include an accelerometer that is coupled to the validation engine and operable to detect a vibration of the personal communication device 110. In some embodiments, the validation engine can use the vibration detected by the accelerometer to verify the operational status of personal communication device 110, e.g., whether the personal communication device 110 is in an airplane mode when it is not supposed to receive messages or communications, or checking the magnitude of the vibration to determine whether the personal communication device is properly inserted into the housing of the active base.

Turning to FIG. 3, a block diagram of an exemplary system 300, which comprises the active base 120 enclosing the personal communication device 110 in communication with the supplemental functional device 160 and/or a remote secure validator in a cloud 340 through secure channels 155 and 157 in accordance with some embodiments. In some embodiments, the supplemental functional device 160 includes a processing element 350, such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. In some embodiments, the supplemental functional device 160 includes sensors 352 to collect information, such as sound, light, temperature, chemicals, drug, and/or biometrics measurement of a user, etc. In some embodiments, the supplemental functional device 160 includes a radio frequency (RF) detection device 356 for detecting RF energy emission and transmission.

The information collected by the sensor(s) 352 and/or the RF detection device 356 are processed by the processing element 350 and communicated to the peripheral interface (e.g., a backpack bus) 150 via the secure channel 155, e.g., through wired connection between the peripheral interface 150 and an interface 354 (e.g., a backpack bus) on the supplemental functional device 160. Upon receiving the information, the peripheral interface 150 sends the information to the local communication device 140 under the management of the controller 122, and the controller 122 further directs the information to the personal communication device 110. The additional information gathered by the supplemental functional device 160 supplements the functionality of the personal communication device 110. Moreover, in some embodiments, the active base 120 analyzes the additional information gathered by the supplemental functional device 160 and uses the information to further determine if the personal communication device 110 has been compromised.

For example, the sensors 352 can be biosensors for environmental monitoring, clinical diagnostic, and/or food analysis. The processing element 350 conducts preprocessing of the data gathered by the sensors 352 and prepares a summary of the data. The processing element 350 directs the summary data to the personal communication device 110 through the secure channel 155 comprising the interface (e.g., the backpack bus) 354, the peripheral interface 150, and the local communication device 140. Further, the active base 120 determines, based on the environmental monitoring (e.g., the presence of chemical, RF energy, infrared wave, a different set of user biometrics data, etc.), whether the personal communication device 110 has been compromised. Thus, the additional data provided by the supplemental functional device 160 not only supplements the functionality of the personal communication device 110, but also enhances the active base's 120 compromise detection capability.

In addition to obtaining information from the supplemental functional device 160, the active base 120 obtains information from the personal communication device 110 pertaining to one or more components of the personal communication device 110. The local communication device 140 receives the information and passes the information to a validation engine 320. In some embodiments, the validation engine 320 is stored in the memory 130 to be executed by controller 122 and validates one of more components of the personal communication device 110 based on the information received from the local communication device 140. In some embodiments, the validation engine 320 includes hardware, software, and/or firmware as described in detail below with reference to FIGS. 4A-4B.

In some embodiments, the validation engine 320 receives the information associated with the personal communication device 110 and validates the information locally. In some embodiments, the information associated with the personal communication device 110 is transmitted to a remote secure validator 340 (e.g., a remove secure validator on a remote server or a private cloud) for further validation remotely. In such embodiments, the active base 120 includes a remote communication device 330 supported by the housing to transmit the information associated with the user equipment to the remote secure validator 340. In some embodiments, the remote secure validator 340 is a trusted source, such that the communication channel between the remote communication device 330 and the remote secure validator 340 is authenticated and secure. The remote communication device 330, in some embodiments, includes one or more wireless communication devices, such as a GPS module 332, a cellular communication module 334, and a WiFi radio 336. The remote communication device 330 uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), wideband code division multiple access (W-CDMA), code division multiple access (CDMA), time division multiple access (TDMA), and/or WiFi (e.g., IEEE 802.11a, IEEE 802.11b, IEEE 802.11g, IEEE 802.11n, and/or IEEE 802.11ac), or any other suitable communication protocol, including communication protocols not yet developed as of the filing date of this document.

Using the data from sensors and/or communication devices on the active base 120, the supplemental functional device 160, and/or the remote secure validator 340, the validation engine 320 can validate sensors and/or communication devices on the personal communication device 110 when the personal communication device 110 is in close proximity to the active base 120, e.g., being held by the active base 120 as shown in FIG. 3. For example, as part of the validation engine, a proximity validation engine can validate the integrity of GPS, NFC, etc. on the personal communication device 110 against GPS, NFC, IMU, RF detector, etc. on the active base 120. In some embodiments, the active base 120 can use readings from a different type of sensor or communication device on the active base 120 to validate the sensor or communication on the personal communication device 110. For example, the active base 120 can use readings from IMU on the active base 120 to validate GPS on the personal communication device 110 when GPS signal is not readily available. In another example, as explained above, the RF detection device 356 can measure RF emission waveforms from an RF emitter in communication with the personal communication device 110. As such, the proximity validation engine can use the RF emission waveforms to determine if the personal communication device 110 in close proximity has been in communication with a legitimate RF emitter. In yet another example, the RF emission detected by the supplemental functional device 160 can be used by the validation engine 320 (e.g., with a presence validation engine) to determine whether the personal communication device 110 resides in the active base 120.

In addition to validating sensors and/or communication devices on the personal communication device 110, in some embodiments, the validation engine 320 can also validate an identity of the user of the personal communication device 110, e.g., with a user validation engine. For example, using fingerprint sensor, camera, IMU, GPS, and/or microphones on the active base, the user validation engine can validate the identity of the user based on the fingerprint, facial image, movements, location, and/or voice data. In another example, using biometric data collected by the supplemental functional device 160, such as scent/odor and/or infrared wave, etc., the user validation engine can identify the user. In yet another example, leveraging machine learning and aggregated data from the remote secure validator 340, the biometric data obtained by the active base 120 and/or the supplemental functional device 160 can be used by the user validation engine for feature extraction and continued multifactor authentication.

Figure 4A:
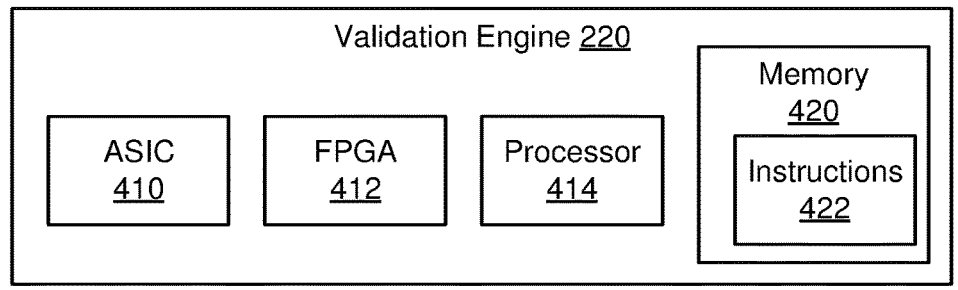
FIGS. 4A and 4B are illustrations of a validation engine for validating the personal communication device and components of the validation engine in accordance with some embodiments.
Figure 4B:
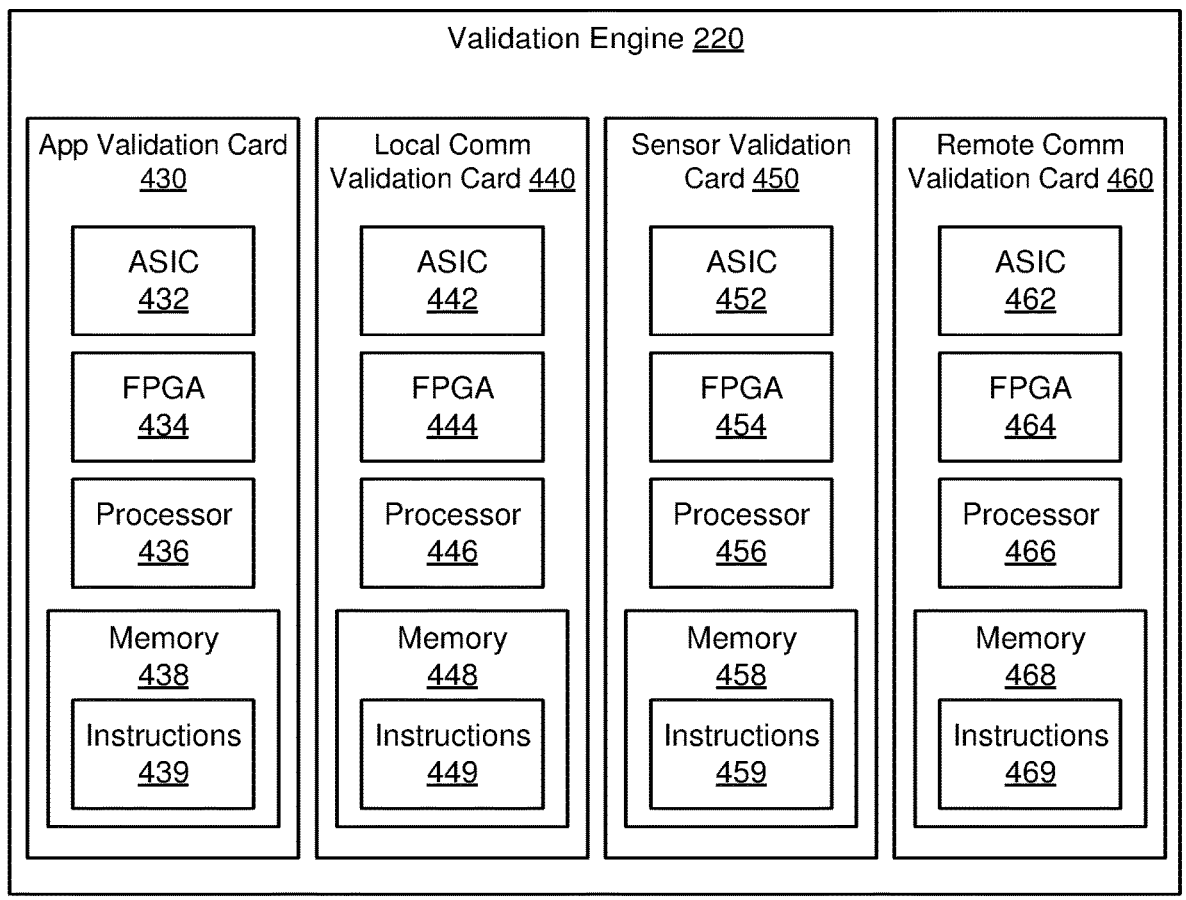

FIGS. 4A and 4B are block diagrams illustrating a validation engine 220 for validating a user equipment and components of the validation engine 220, in accordance with some embodiments. The validations performed by the validation engine 220 are illustrated in FIGS. 5-8 in accordance with some embodiments.

In FIG. 4A, a simplified block diagram 400A of the validation engine 220 in accordance with some embodiments, the validation engine 220 includes one or more processing elements, such as ASIC 410, portions or circuits of individual processor cores, entire processor cores, individual processors, programmable hardware devices such as an FPGA 412, and/or larger portions of systems that include one or more processors 414. In some embodiments, the validation engine 220 includes memory 420, which further includes one or more memory devices. In some embodiments, the memory 111 provides a non-transitory computer-readable storage medium that stores computer program instructions 422 to be executed by the processor 414.

In FIG. 4B, a simplified block diagram 400B of sub-engines of the validation engine 220, the validation engine 220 includes an application validation card 430, a local communication validation card (e.g., GPS validation card) 440, a sensor validation card 450, and a remote communication validation card 460, in accordance with some embodiments. In some embodiments, the application validation card 430 includes one or more processing elements, such as ASIC 432, portions or circuits of individual processor cores, entire processor cores, individual processors, programmable hardware devices such as an FPGA 434, and/or larger portions of systems that includes one or more processors 436. In some embodiments, the application validation card 430 includes memory 438, which further includes one or more memory devices. In some embodiments, the memory 438 includes a non-transitory computer-readable storage medium that can store computer program instructions 439 to be executed by the processor 436. In some embodiments, the application validation card 430 serves as an application validation engine to validate operational integrity of an application on the personal communication device 110. The operation of the application validation engine is shown in FIG. 5.

Figure 5:
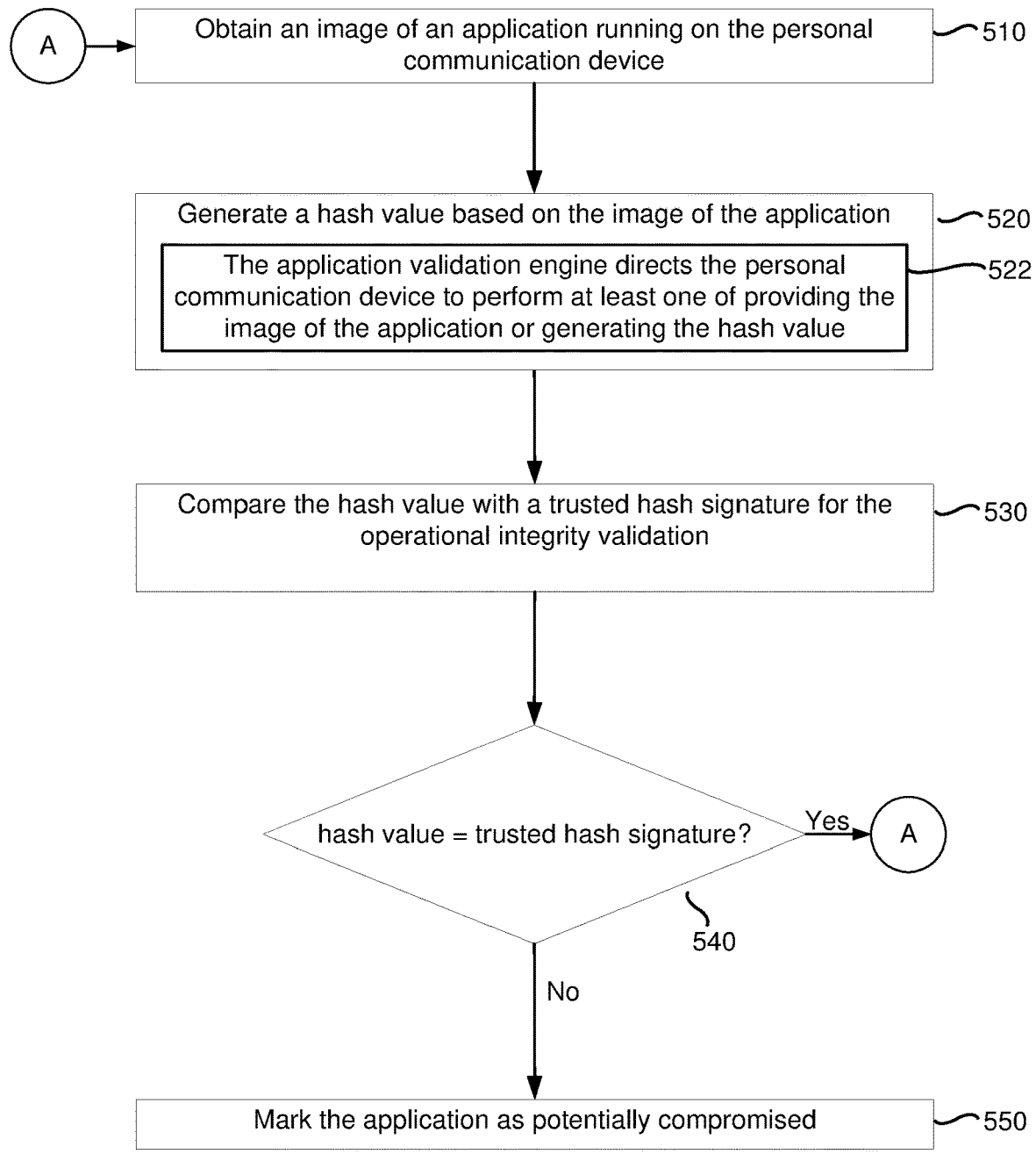
FIG. 5 is a flowchart illustrating a method of validating operational integrity of an application on the personal communication device in accordance with some embodiments.

FIG. 5 is a flowchart representation of a method 500 of validating operational integrity of an application (e.g., the application 113, FIG. 1) on the personal communication device 110, in accordance with some embodiments. As represented by block 510, the method 500 includes obtaining an image of an application running on the personal communication device 110. In some embodiments, the method 500 includes obtaining an electronic device image, regardless whether the image is a file, an application, an operating system, firmware, or hardware of the personal communication device.

Malware at the chip level, firmware level, operating system level, or application can be used to turn on microphones so unwanted third parties can eavesdrop on conversations happening around a phone. For example, applications including mobile browsers, messaging apps, etc.), application platforms, and application stores can be compromised to provide illegitimate access to smartphones. In another example, vulnerabilities within operating systems can be exploited to compromise and control a smartphone. Below the application and operating system level, firmware can be hacked, and such hacking is invisible to protections at the operating system or application layer. By generating an image for a file, an application, an operating system, firmware, or hardware, the application validation engine is capable of validating operational integrity at any layer of the personal communication device 110.

As represented by block 520, the method 500 includes generating a hash value based on the image of the application, in accordance with some embodiments. As represented by block 522, in some embodiments, the application validation engine directs the personal communication device 110 to perform at least one of providing the image of the application or generating the hash value. As represented by block 530, the method 500 includes comparing the hash value with a trusted hash signature for the operational integrity validation. In some embodiments, when the generated hash value is not the same as the trusted hash signature, ("No" path from block 540), as represented by block 550, the method 500 includes marking the application as potentially compromised for further analysis or taking immediate action, e.g., quarantining the compromised application or notifying the user of the personal communication device 100. On the other hand, with reference to block 540, if the generated hash value is the same as the trusted hash signature ("Yes" path from block 540), the method 500 includes circling back to the portion of the method 500 represented by block 510, where the same or a different application is analyzed for operational integrity validation.

In some embodiments, the trusted hash signatures are generated based on a hardware root of trust, e.g., using a specialized system and crypto architecture to create a root key using a hardware true random number generator and stores the root key in the secure storage of the active base, e.g., the memory 130 in FIG. 1. As such, the root key is not exposed and cannot be externally extracted. In some embodiments, the active base can then generate certificate signing requests within the device as the trusted hash signatures. Accordingly, an appropriate certificate bundle (e.g., a X.509 certificate bundle) can be produced, provisioned, and stored within the device to maintain stringent control of allowed processes for execution prior to deployment.

Referring back to FIG. 4B, in some embodiments, the validation engine 220 includes the local communication validation card 440, which further includes one or more processing elements, such as ASIC 442, portions or circuits of individual processor cores, entire processor cores, individual processors, programmable hardware devices such as an FPGA 444, and/or larger portions of systems that includes one or more processors 446. In some embodiments, the local communication validation card 440 includes memory 448, which further includes one or more memory devices. In some embodiments, the memory 448 includes a non-transitory computer-readable storage medium that can store computer program instructions 449 to be executed by the processor 446. In some embodiments, the local communication validation card 440 serves as a local communication validation engine to validate operational integrity of a communication modem included in the personal communication device 110. The operation of the local communication validation engine is shown in FIG. 6.

Figure 6:
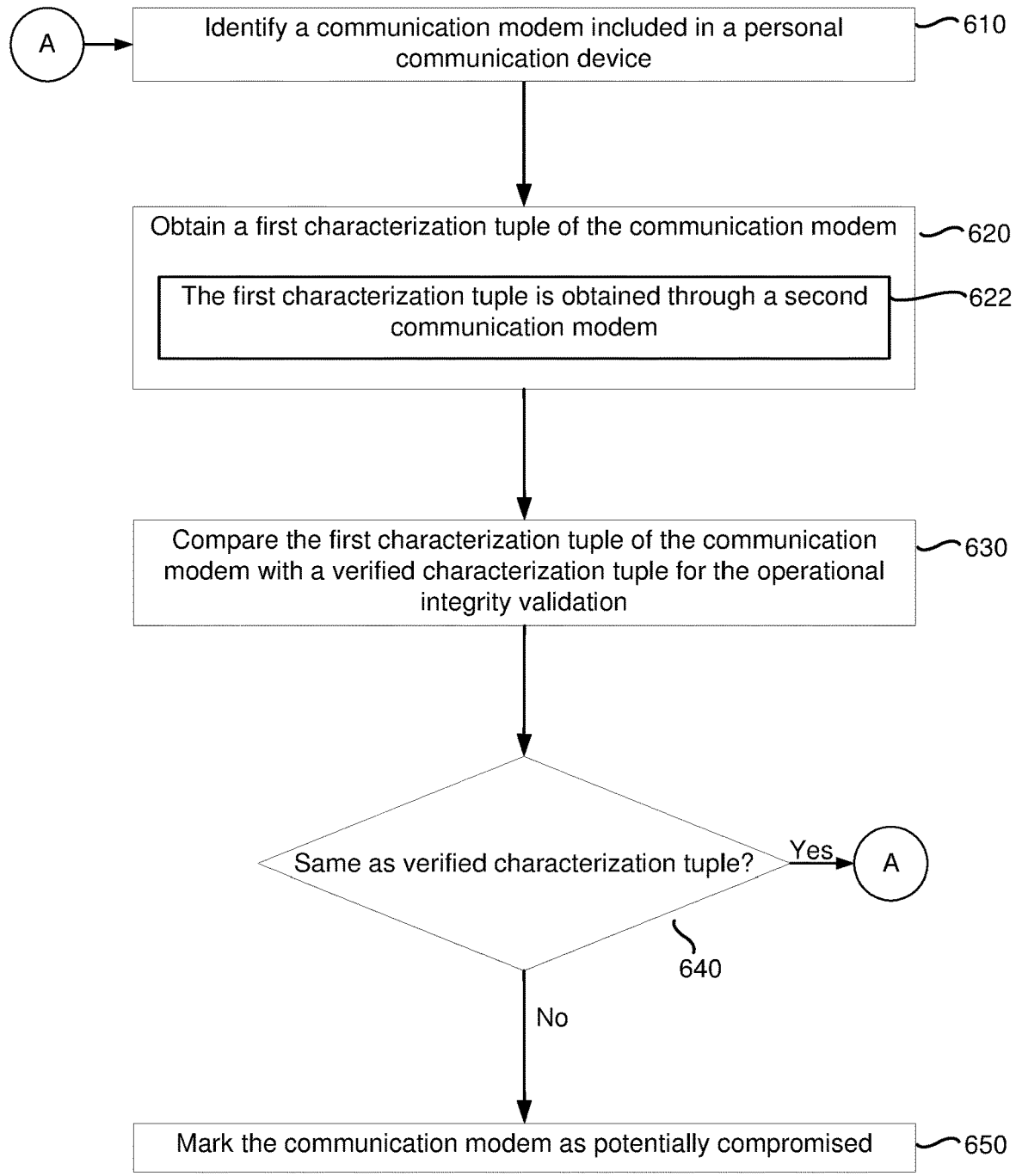
FIG. 6 is a flowchart illustrating a method of validating operational integrity of a communication modem included in the personal communication device in accordance with some embodiments.

FIG. 6 is a flowchart representation of a method 600 of validating operational integrity of a communication modem (e.g., the communication device 114, FIG. 1) included in the personal communication device 110, in accordance with some embodiments. As represented by block 610, the method 600 includes identifying a communication modem included in the personal communication device 110. For example, the communication modem can be a WiFi modem, a BT/BLE radio, an infrared radio, an NFC radio, or a Lightning® (a registered trademark of Apple Inc. of Cupertino, Calif.) connector. Having identified the communication modem to be validated, as represented by block 620, the method 600 includes obtaining a first characterization tuple of the communication modem. For example, the first characterization tuple includes at least one of MAC address, data logs, beacon logs, control signals issued by the personal communication device 110, changes in permissions, etc., that characterize the operation of the communication modem.

As represented by block 622, in some embodiments, the first characterization tuple is obtained through a second communication modem. For example, in order to validate a Bluetooth device that potentially has been compromised, the active base 120 obtains the characterization tuple of the Bluetooth device through a Lightning® (a registered trademark of Apple Inc. of Cupertino, Calif.) connector coupled to the personal communication device 110. The characterization tuple of the Bluetooth device thus is obtained independently for validation.

As represented by block 630, the method 600 includes comparing the first characterization tuple of the communication modem with a verified characterization tuple for the operational integrity validation. In some embodiments, when the characterization of the communication modem has changed, ("No" path from block 640), as represented by block 650, the method 600 includes marking the communication modem as potentially compromised for further analysis or taking immediate action, e.g., disabling the compromised communication modem or notifying the user of the personal communication device 100. On the other hand, with reference to block 640, if the characterization of the communication modem remains the same ("Yes" path from block 640), the method 600 includes circling back to the portion of the method 600 represented by block 610, where the same or a different communication modem is analyzed for operational integrity validation.

Referring back to FIG. 4B, in some embodiments, the local validation engine 220 includes a sensor validation card 450, which further includes one or more processing elements, such as ASIC 452, portions or circuits of individual processor cores, entire processor cores, individual processors, programmable hardware devices such as an FPGA 454, and/or larger portions of systems that includes one or more processors 456. In some embodiments, the sensor validation card 450 includes memory 458, which further includes one or more memory devices. In some embodiments, the memory 458 includes a non-transitory computer-readable storage medium that can store computer program instructions 459 to be executed by the processor 456. In some embodiments, the sensor validation card 450 serves as a sensor validation engine to validate operational integrity of a sensor of the personal communication device 110. The operation of the sensor validation engine is shown in FIG. 7.

Figure 7:
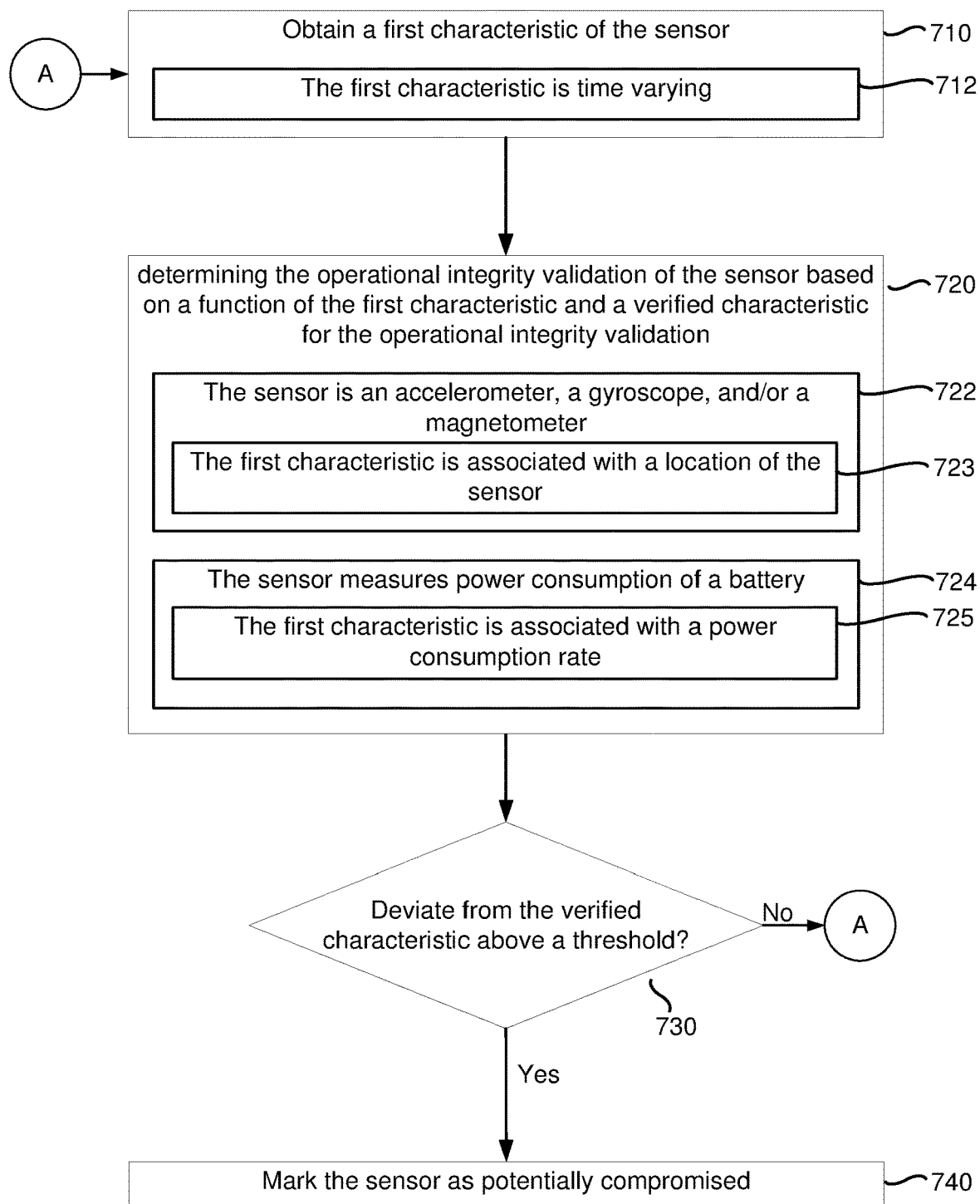
FIG. 7 is a flowchart illustrating a method of validating operational integrity of a sensor of the personal communication device in accordance with some embodiments.

FIG. 7 is a flowchart representation of a method 700 of validating operational integrity of a sensor (e.g., the sensor 118, FIG. 1) of the personal communication device 110, in accordance with some embodiments. As represented by block 710, the method 700 includes obtaining a first characteristic of the sensor. In some embodiments, as represented by block 712, the first characteristic of the sensor is time varying. As represented by block 720, the method 700 includes determining the operational integrity validation of the sensor based on a function of the first characteristic and a verified characteristic for the operational integrity validation. For example, during a certain time of the day, a sensor collecting sound or light information generates certain amounts of data and/or requests to transmit certain amount of data. The typical data generation and/or transfer volume at the certain time of the day is the verified characteristic for the sensor. In case the verified characteristic is a few kilobytes of data production per hour, a spike in the data volume generated by the sensor indicates a potential compromise of the personal communication device 110.

In another example, as represented by block 722, the sensor is an accelerometer, a gyroscope, and/or a magnetometer of the personal communication device 110, and as represented by block 723, the first characteristic shows a location of the sensor, e.g., locations along the driving route to work in the morning during rush hour. In case the verified characteristic describes a typical route to work every morning during rush hour, a significant deviation from the typical route indicates a potential compromise of the personal communication device 110.

In yet another example, as represented by block 724, the sensor measures the power consumption of a power source (e.g., a battery) of the personal communication device 110. As represented by block 725, the first characteristic is associated with a power consumption rate. In case the consumption rate of the battery is significantly faster than the verified average power consumption rate (e.g., the difference between the consumption rate and the verified average power consumption rate breaches a threshold), the personal communication device 110 is potentially compromised. For example, the execution of malware consumes extra processing power, which results in a greater consumption of battery power.

In some embodiments, sensors included in the active base 120 (e.g., GPS, gyroscopes, accelerometers, magnetometer, RF power sensor, ambient noise power detector, envelope detector, etc.) can be used for comparing the data collected by the sensors included in the active base 120 to a comparable sensor on the personal communication device 110 to see if malware is somehow manipulating the comparable sensor, e.g., a potential indicator of compromise when the IMUs on the personal communication device 110 show different readings from the IMUs on the active base 120. Alternatively, some sensors included in the active base 120, e.g., the RF power sensor, can be used to determine of the personal communication device 110, e.g., a smart phone is transmitting RF signals while it is in airplane mode. In some embodiments, some sensors included in the active base 120 can be used to determine trusted location, e.g., determining if the active base 120 holding the personal communication device 110 is in a geo-fenced area, trusted networks (e.g., a WiFi honey pot). The information collected from such sensors included in the active base 120 can be used for generating biometric or behavioral and/or continuous multi-factor authentication (CMFA).

In some embodiments, when the deviation of the first characteristic from the verified characteristic breaches a threshold, ("Yes" path from block 730), the method 700 includes marking the sensor as potentially compromised for further analysis or taking immediate action, e.g., disabling the sensor or notifying the user of the personal communication device 110. On the other hand, with reference to block 730, if the deviation of the first characteristic from the verified characteristic does not breach a threshold ("No" path from block 730), the method 700 includes circling back to the portion of the method 700 represented by block 710, where the same or a different sensor is analyzed for operational integrity validation.

Referring back to FIG. 4B, in some embodiments, the validation engine 220 includes a remote communication validation card 460, which further includes one or more processing elements, such as ASIC 462, portions or circuits of individual processor cores, entire processor cores, individual processors, programmable hardware devices such as a FPGA 464, and/or larger portions of systems that includes one or more processors 466. In some embodiments, the remote communication validation card 460 includes memory 468, which further includes one or more memory devices. In some embodiments, the memory 468 includes a non-transitory computer-readable storage medium that can store computer program instructions 469 to be executed by the processor 466. In some embodiments, the remote communication validation card 460 serves as a remote communication validation engine to validate operational integrity of a remote communication device included in the personal communication device 110. The operation of the remote communication validation engine is shown in FIG. 8.

Figure 8:
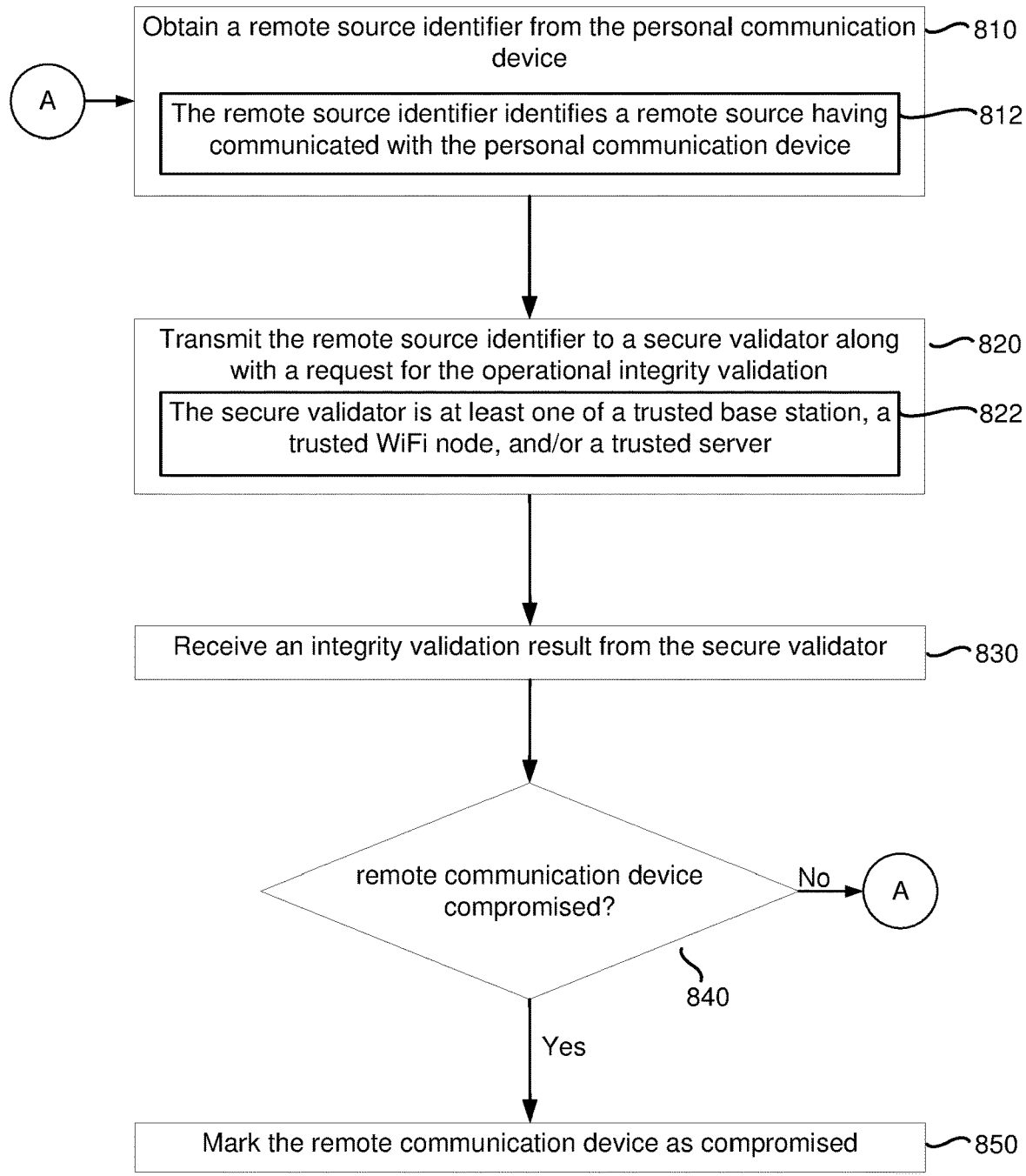
FIG. 8 is a flowchart illustrating a method of validating operational integrity of a remote communication device included in the personal communication device in accordance with some embodiments.

FIG. 8 is a flowchart representation of a method 800 of validating operational integrity of a remote communication device (e.g., the remote communication device 330, FIG. 3) included in the personal communication device 110, in accordance with some embodiments. As represented by block 810, the method 800 includes obtaining a remote source identifier from the personal communication device 110. In some embodiments, as represented by block 812, the remote source identifier identifies a remote source having communicated with the personal communication device 110, e.g., an identification of a cell tower, or WiFi hotspot.

Because the radios included in the personal communication device 110 receive and send RF signals to connect with cell towers and/or WiFi hotspots, they are susceptible to malicious signals emitted from unregistered towers, cell interceptors, or rogue WiFi hotspots. As soon as these connections take place third-parties can eavesdrop on calls, capture messages, or install malware on the personal communication device 110. In another example, instead of directly using GPS satellites, many mobile devices receive much faster assisted GPS (A-GPS) signals from cellular networks to determine the approximate location. These A-GPS messages are transmitted over a non-secure internet link and can be switched for messages from an attacker. In these situations, the compromise occurs without the user taking any action or having any awareness that the compromise has taken place. Identifying the remote source identifier can facilitate the detection of these types of attacks.

In some embodiments, the remote source identifier is obtained using the communication capabilities associated with the active base 120. For example, using WiFi modem included in the active base 120 and/or a RF sensor backpack attached to the apparatus, the active base 120 can obtain the information associated with the remote source. In such embodiments, the active base 120 determines if the personal communication device 110 is communicating to a potentially bad or risky remote source through one of its remote communication devices 330. For example, based on the information collected by sensors of the active base 120, a cell base station seems to be moving, or a base station is not in the FCC database, or a base station is lowering its protocol to 2G from 3G while communicating to the personal communication device 110, the remote communication validation card 460 can determine that the base station is a rogue base station.

As represented by block 820, in some embodiments, the method 800 incudes transmitting the remote source identifier to a secure validator along with a request for the operational integrity validation. In some embodiments, as represented by block 822, the secure validator is at least one of a trusted base station, a trusted WiFi node, and/or a trusted server, e.g., the remote secure validator on a remote server or in the cloud 340 of FIG. 3. As represented by block 830, the method 800 includes receiving an integrity result from the secure validator. As represented by block 840, when the integrity validation results indicate that the remote communication device 330 included in the personal communication device 110 has been compromised ("Yes" path from block 840), the method 600 includes marking the remote communication device as potentially compromised for further analysis or taking immediate action, e.g., disabling the compromised remote communication device or notifying the user of the personal communication device 100. On the other hand, with reference to block 840, if the integrity validation results indicate that the remote communication device 330 included in the personal communication device 110 has not been compromised ("No" path from block 840), the method 800 includes circling back to the portion of the method 800 represented by block 810, where the same or a different communication modem is analyzed for operational integrity validation.

For example, the supplemental functional device 160 can triangulate and report RF emitters associated with unregistered towers, cell interceptors, or rogue WiFi hotspots. The active base 120 receives the RF emitter information from the supplemental functional device 160 through the secure channel 155 (FIG. 1) and transmits the information to the secure validator in the cloud 340 through another secure channel. The remote secure validator in the cloud 340 stores the rogue station or hotspots in a database. Once a request for validating a remote source identifier is received, the remote secure validator queries the database to determine if the remote source identifier is associated with a rogue station or hotspots. The remote secure validator 340 then sends the results to the active base 120 and alerts the user to avoid potential compromise in accordance with some embodiments. In some embodiments, the remote secure validator 340 also monitors uplink traffic flow and packet destinations of the personal communication device 110, generates reports, and sends reports to a secure base station for threat analysis, e.g., through the secure channel 157 (FIG. 3).

In some embodiments, the validation engine 220 also includes validation of the supplemental functional device 160, e.g., with an equipment validation engine. For example, when a supplemental functional device 160 plugs in, the validation engine 220 validates it to make sure the supplemental functional device 160 is properly attached and is an authorized supplemental functional device. In some embodiments, as explained above with reference to FIGS. 2A-2C, when the supplemental functional device 160 plugs in, a communication channel is established between the active base 120 and the supplemental function device 160. Further as explained above with reference to FIG. 1, the controller 122 manages the communication channel between the active base 120 and the supplemental functional device 160. As such, in some embodiments, the controller 122 performing the function of the validation engine 220 validates the supplemental functional device 160 by obtaining information from the supplemental functional device 160 through the communication channel and validating the identity of the supplemental functional device 160.

In some embodiments, the validation engine 220 also validates the status of the personal communication device 110 with respect to its related position to the housing 125 of the active base 120, e.g., whether the personal communication device 110 is placed in the housing 125 or has been taken out of the active base 120.

In some embodiments, the validation engine 220 also validates the status of protection mechanisms, such as whether the microphones of the personal communication device 110 is being jammed through the speakers of the active base 120 to prevent a third party from eavesdropping, or whether the cameras of the personal communication device 110 is being exposed while the active base 120 is supposed to cover the cameras of the personal communication device 110.

In some embodiments, the validation engine 220 can also apply rules, such as if a microphone or a camera are exposed in a certain location, and sends an alert based on the rules.

In some embodiments, the validation engine 220 validates a firmware level of the active base 120 and/or the personal communication device 110 against the latest firmware level available.

In some embodiments, the validation engine 220 validates the level of ambient noise in which the active base 120 is operating (via an analog microphone envelope detector of the active base 120). The level of ambient noise is then used to vary the power level of the audio jamming provided by the active base 120 to balance protection level and obtrusiveness of the jamming noise and to verify the proper functioning of audio jamming.

In some embodiments, the validation engine 220 validates encrypted communications to/from the active base 120, e.g., to make sure that the active base 120 (or the personal communication device 110 through the active base 120) is communicating with devices with valid certificates, etc.

In some embodiments, the validation engine 220 validates the battery power level and LEDs of the active base 120 and/or alerts to indicate if the power level is getting low and protections provided by the active base 120 is becoming inoperative. For example, when the LEDs on the active base 120 flash red, the validation engine 220 sends a message/alert to an application or the cloud.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. An apparatus comprising:
   a housing arranged to hold a personal communication device;
   a local communication device at least partially supported by the housing, wherein the local communication device includes a personal communication device interface modem operable to provide a communication channel associated with the personal communication device;
   a non-transitory memory at least partially supported by the housing; and
   a controller coupled to the local communication device and the non-transitory memory, wherein a validation engine stored in the non-transitory memory, which, when executed by the controller, causes the apparatus to use a root key created on the apparatus to generate one or more certificates and use the one or more certificates to validate at least one of one or more portions of the personal communication device, a user of the personal communication device, or operational status of the personal communication device through the local communication device, wherein:
   the one or more certificates include certificates of safe processes, and the validation engine includes a chain validation engine, which, when executed by the controller, causes the apparatus to use a hardware root of trust to validate processes, including obtaining, via the local communication device, a signature of a process on the personal communication device, and validating the process by comparing the signature of the process with the certificates of safe processes.

2. The apparatus of claim 1, wherein the housing includes a plurality of components mateable with one another, including at least one switch connectable to the validation engine.

3. The apparatus of claim 2, wherein the validation engine includes an equipment validation engine, which, when executed by the controller, causes the apparatus to validate the one or more portions of the personal communication device or the operational status of the personal communication device based on a position of the at least one switch.

4. The apparatus of claim 1, wherein the validation engine includes a presence validation engine operable to identify radio frequency (RF) emission from the personal communication device in order to validate that the housing holds the personal communication device.

5. The apparatus of claim 1, further comprising a magnet and a magnetometer, wherein:
the magnet is coupled to a moving component of the housing;
the magnetometer is coupled to the validation engine and operable to measure a change in magnetic field caused by a movement of the magnet coupled to the housing; and
the validation engine, when executed by the controller, further causes the apparatus to validate loading or unloading of the personal communication device based on the change in the magnetic field caused by the movement of the magnet coupled to the housing.

6. The apparatus of claim 1, further comprising an RF power detector, at least partially supported by the housing and connectable to the local communication device, operable to detect an RF emission waveform in proximity to the personal communication device.

7. The apparatus of claim 6, wherein the validation engine includes a proximity validation engine connectable to the RF power detector, when the proximity validation engine is executed by the controller, causes the apparatus to obtain an operational mode of the personal communication device and validate whether or not the RF emission waveform is consistent with the operational mode.

8. The apparatus of claim 1, further comprising a peripheral interface at least partially supported by the housing, wherein the peripheral interface is connectable to a supplemental functional device.

9. The apparatus of claim 8, wherein the validation engine is connectable to the peripheral interface through the local communication device and operable to obtain an identifier of the supplemental functional device and authenticate the supplemental functional device based at least in part on the identifier.

10. The apparatus of claim 8, wherein the validation engine is connectable to the peripheral interface through the local communication device and operable to trigger an authentication of the supplementation function device by a second device, distinct from the apparatus, and receive an authentication result from the second device.

11. The apparatus of claim 1, further comprising a first remote communication interface at least partially supported by the housing, wherein the personal communication device includes a second remote communication interface.

12. The apparatus of claim 11, wherein the validation engine, when executed by the controller, further causes the apparatus to compare information from the first remote communication interface with information from the second remote communication interface to validate the second remote communication interface.

13. The apparatus of claim 1, further comprising a power supply provided to supply power to the local communication device, the non-transitory memory, and the controller.

14. The apparatus of claim 13, wherein the validation engine, when executed by the controller, further causes the apparatus to obtain a power level of the power supply and trigger an alert when the power level is below a threshold.

15. The apparatus of claim 1, wherein the validation engine includes a user validation engine, which, when executed by the controller, causes the apparatus to validate an identity of the user of the personal communication device, including:
obtaining biometric data of the user from one or more sensors that are at least partially supported by the housing; and
authenticating the user based on the biometric data.

16. The apparatus of claim 1, wherein the validation engine includes an encryption validation engine, which, when executed by the controller, causes the apparatus to validate at least one of validity or integrity of encrypted communication through the local communication device, including:
obtaining certificates in the encrypted communication;
determining whether or not the certificates are valid based on the one or more certificates; and
triggering an alert or action in response to a determination that the certificates are invalid.

17. The apparatus of claim 1, further comprising an accelerometer, coupled to the validation engine and operable to detect a vibration of the personal communication device and notify the validation engine of the vibration.

18. The apparatus of claim 1, further comprising a microphone and a speaker, coupled to the validation engine, wherein:
the speaker is operable to output masking signals;
the microphone is operable to detect audio signals proximate to the apparatus; and
the validation engine includes an audio path validation engine, which, when executed by the controller, causes the apparatus to validate an amplitude of at least a portion of the masking signals detected by the microphone.

19. The apparatus of claim 1, wherein using a hardware root of trust to create the root key includes using a hardware true random number generator to create the root key and stored storing the root key in the non-transitory memory.

20. The apparatus of claim 1, wherein the certificates of safe processes are generated and provisioned on the apparatus, and stored in the non-transitory memory.

* * * * *

UNITED STATES PATENT AND TRADEMARK OFFICE
CERTIFICATE OF CORRECTION

| | |
|---|---|
| PATENT NO. | : 11,284,257 B2 |
| APPLICATION NO. | : 16/409536 |
| DATED | : March 22, 2022 |
| INVENTOR(S) | : Michael Fong, Neric Hsin-Wu Fong and Teddy David Thomas |

It is certified that error appears in the above-identified patent and that said Letters Patent is hereby corrected as shown below:

On the Title Page

In the Inventors (72):
Change "Nerie Hsin-Wu Fong" to --Neric Hsin-Wu Fong--

Signed and Sealed this
Seventh Day of June, 2022

Katherine Kelly Vidal
*Director of the United States Patent and Trademark Office*